US008823665B2

(12) United States Patent
Hsieh

(10) Patent No.: US 8,823,665 B2
(45) Date of Patent: Sep. 2, 2014

(54) HANDHELD ELECTRONIC DEVICE AND FRAME CONTROL METHOD OF DIGITAL INFORMATION THEREOF

(75) Inventor: Tai-Jung Hsieh, Zhubei (TW)

(73) Assignee: Altek Corporation, Hsinchu (TW)

( * ) Notice: Subject to any disclaimer, the term of this patent is extended or adjusted under 35 U.S.C. 154(b) by 135 days.

(21) Appl. No.: 13/468,771

(22) Filed: May 10, 2012

(65) Prior Publication Data

US 2013/0278510 A1  Oct. 24, 2013

(30) Foreign Application Priority Data

Apr. 23, 2012  (TW) .............................. 101114299 A

(51) Int. Cl.
  *G06F 3/041*  (2006.01)
(52) U.S. Cl.
  USPC ........ 345/173; 345/174; 345/184; 178/18.01; 178/20.04
(58) Field of Classification Search
  CPC ....................................................... G06F 3/041
  USPC ............................ 345/173–184; 340/984–996
  See application file for complete search history.

(56) References Cited

U.S. PATENT DOCUMENTS

| 2008/0211785 | A1* | 9/2008 | Hotelling et al. ............. 345/173 |
| 2010/0289825 | A1* | 11/2010 | Shin et al. ...................... 345/667 |
| 2011/0061009 | A1* | 3/2011 | Poisson et al. ................ 715/764 |
| 2012/0026100 | A1* | 2/2012 | Migos et al. .................. 345/173 |
| 2013/0147833 | A1* | 6/2013 | Aubauer et al. .............. 345/619 |
| 2013/0152002 | A1* | 6/2013 | Menczel et al. .............. 715/765 |
| 2013/0154952 | A1* | 6/2013 | Hinckley et al. ............. 345/173 |
| 2013/0187860 | A1* | 7/2013 | Fredriksson et al. ......... 345/173 |
| 2013/0212540 | A1* | 8/2013 | Krishnamurthy et al. .... 715/854 |

* cited by examiner

Primary Examiner — Amare Mengistu
Assistant Examiner — Vinh Lam
(74) Attorney, Agent, or Firm — Wang Law Firm, Inc.; Li K. Wang; Stephen Hsu

(57) ABSTRACT

A handheld electronic device and a frame control method of digital information thereof. The handheld electronic device comprises a display module, a detection module and a processing module. The display module is used to display the digital information. The detection module is connected to the display module and used to detect whether the display module is touched by a predetermined method and also used to detect a duration time or a motion track when the display module is touched by the predetermined method. The processing module is connected to the display module and the detection module and determines whether the duration time exceeds a threshold value or the motion track corresponds to a preset graphic. When the duration time exceeds the threshold value or the motion track corresponds to the preset graphic, the processing module would execute a preset process action of the digital information.

9 Claims, 8 Drawing Sheets

HANDHELD ELECTRONIC DEVICE AND FRAME CONTROL METHOD OF DIGITAL INFORMATION THEREOF

CROSS-REFERENCE TO RELATED APPLICATION

This application claims the benefit of Taiwan Patent Application No. 101114299, filed on Apr. 23, 2012, in the Taiwan Intellectual Property Office, the disclosure of which is incorporated herein in its entirety by reference.

BACKGROUND OF THE INVENTION

1. Field of the Invention

The present invention relates to a handheld electronic device and a frame control method of digital information thereof, and more particularly to the handheld electronic device and the frame control method of digital information that adopt a simple touch method of using one or two fingers to control the digital information.

2. Description of Related Art

As science and technology advance, conventional handheld electronic communication devices (such as mobile phones) come with increasingly more functions. For example, the smartphone with powerful computing capability can be used for browsing the Internet, performing position navigation, editing documents, and playing audios and videos, and most of the present smartphones use a touch screen which is a sensing type LCD device capable of receiving an inputted signals made by a touching object (such as a finger or a plastic pen tip. If an icon appeared on the screen is touched, the touch feedback system of the screen, which can be used to replace the mechanical press-key panel, can drive various link devices according to a preset program. And the LCD screen can create lively audio and video effects. The present touch panel allows users to control and scroll the content of digital information appeared on the screen by a touch control method, so that the users can change pages or can scroll the screen to browse a webpage, review a document or a picture.

However, the general conventional touch handheld electronic device, which provides a simple and easy operation method for the users to control switching the screen or the information, requires more complicated different hand postures for the users to control the operations of a frame enlargement, a frame reduction, and a frame rotation of the digital information. Obviously, the conventional touch handheld electronic device is relatively inconvenient to use.

SUMMARY OF THE INVENTION

In view of the aforementioned problems of the prior art, it is a primary objective of the invention to provide a handheld electronic device and a frame control method of digital information to overcome the problems of requiring more complicated and different hand postures to control the digital information.

To achieve the foregoing objective, the present invention provides a handheld electronic device, comprising a display module, a detection module and a processing module. The display module displays digital information. The detection module is coupled to the display module for detecting whether the display module is touched by a predetermined method. If the display module is touched by the predetermined method, the detection module detects a duration time or a motion track of the display module. The processing module is coupled to the display module and the detection module, for determining whether or not the duration time is greater than a threshold value or the motion track corresponds to a preset graphic; and performing a preset processing action of the digital information if the duration time is greater than the threshold value or the motion track corresponds to the preset graphic.

Preferably, if the detection module detects that the display module is touch by the predetermined method of a single touch, the detection module detects the duration time of touching the display module. And the processing module determines whether or not the duration time is greater than the threshold value. If the duration time is greater than the threshold value, the processing module performs the preset processing action of a frame reduction of the digital information.

Preferably, if the detection module detects that the display module is no longer touched, the processing module stops performing the preset processing action of the frame reduction of the digital information.

Preferably, if the detection module detects the display module is touched by the predetermined method of a double touch, the detection module detects the duration time of touching the display module. And the processing module determines whether the duration time is greater than the threshold value. If the duration time is greater than the threshold value, the processing module performs the preset processing action of a frame enlargement of the digital information.

Preferably, if the detection module detects that the display module is no longer touched, the processing module stops performing the preset processing action of the frame enlargement of the digital information.

Preferably, if the detection module detects that the display module is touched by the predetermined method of a single touch and a sliding action, the detection module detects the motion track of the touched display module. And the processing module determines whether the motion track corresponds to the preset graphic. If the motion track corresponds to the preset graphic, the processing module performs the preset processing action of a frame rotation of the digital information.

Preferably, the display module comprises a click area disposed separately on both sides of the display module. If the detection module detects that one of the click areas of the display module is touched by the predetermined method of a single touch, the detection module further detects the duration time of touching the display module. And the processing module determines whether the duration time is greater than the threshold value. If the duration time is greater than the threshold value, the processing module performs the preset processing action to switch the digital information to other digital information.

Preferably, the display module sets a detecting area, and the detection module performs a touch detection of the detecting area.

To achieve the foregoing objective, the present invention further provides a frame control method of digital information applied in a handheld electronic device. The method comprises the steps of: displaying digital information through a display module of the handheld electronic device; detecting whether the display module is touched by a predetermined method through a detection module of the handheld electronic device, and detecting a duration time or a motion track of the touched display module if the display module is touched by the predetermined method; and using a processing module of the handheld electronic device to determine whether the duration time is greater than a threshold value or the motion track corresponds to a preset graphic, and performing a preset processing action of the digital information if the duration time is greater than a threshold value or the motion track corresponds to a preset graphic.

In summation, the handheld electronic device and the frame control method of digital information of the present invention, provides users to control the operation of the digital information appeared on the screen by simple hand postures of one or two fingers, so that the effects of frame enlargement, frame reduction, frame rotation or frame switching of the digital information can be performed easily. In addition, the invention is practical and user-friendly.

DETAILED DESCRIPTION OF THE PREFERRED EMBODIMENTS

The technical contents and characteristics of the present invention will be apparent with the detailed description of a preferred embodiment accompanied with related drawings as follows. For simplicity, same numerals are used in the following preferred embodiment to represent respective same elements.

Figure 1:
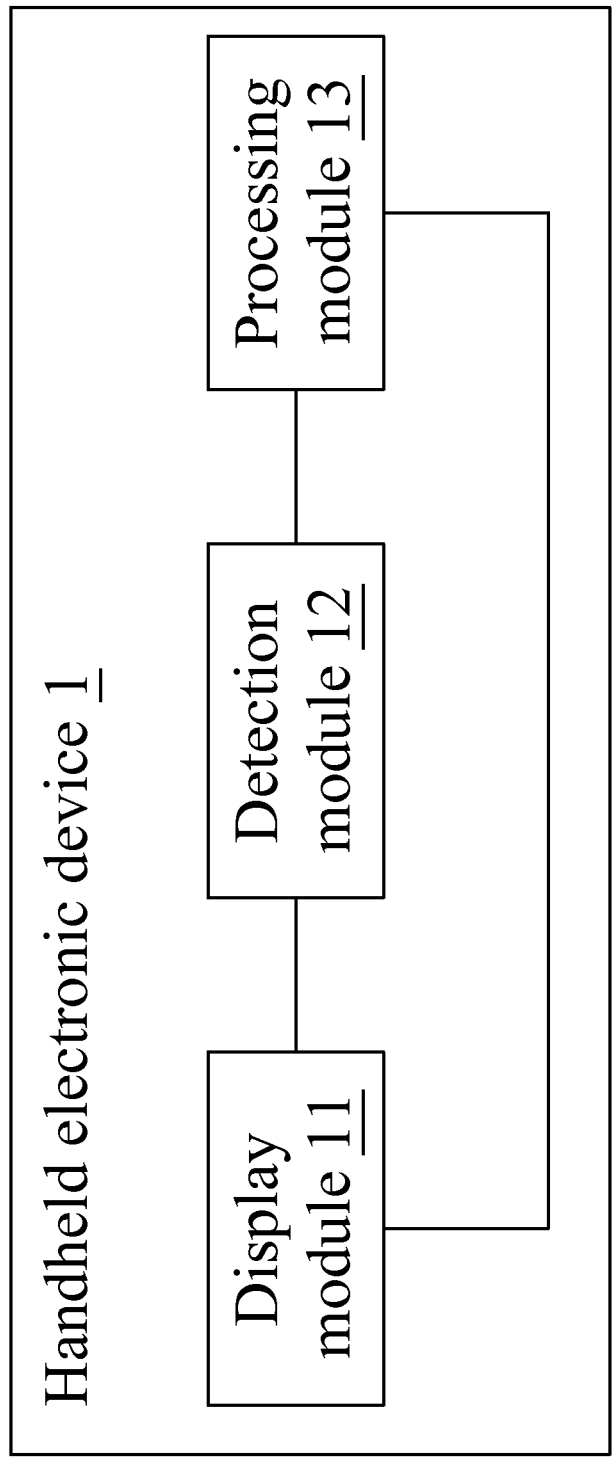
FIG. 1 is a block diagram of a handheld electronic device in accordance with the present invention.

With reference to FIG. 1 for a block diagram of a handheld electronic device of the present invention, the handheld electronic device 1 comprises a display module 11, a detection module 12 and a processing module 13. The detection module 12 is coupled to the display module 11, and the processing module 13 is coupled to the display module 11 and the detection module 12. The display module 11 can be a liquid crystal display (LCD) or liquid emitting diode (LED) screen. The detection module 12 can be a pressure sensor or any sensor capable of detecting a touch made by human body. The processing module 13 can be a processing chip or a computation control program. Wherein, the display module 11 and the detection module 12 can be integrated into a touch panel. The touch panel includes a resistive touch panel, a capacctive touch panel, a sonic touch panel, an optical touch panel or an electromagnetic touch panel.

In the description above, the display module 11 is provided for displaying digital information such as photos, webpages or documents. The detection module 12 is provided for detecting whether the display module 11 is touched by a predetermined method; if yes, the detection module 12 further detects a duration time or a motion track of the touched display module 11. Wherein, the foregoing predetermined method includes a single touch, a double touch, or a single touch plus a sliding action. The processing module 13 determines whether the duration time detected by the detection module 12 is greater than a threshold value, or determines whether the motion track corresponds to a preset graphic. If the duration time is greater than the threshold value or the motion track corresponds to the preset graphic, the processing module 13 will perform a preset processing action of the digital information. Wherein, the threshold value can be set within a range from 0.5 second to 1 second, but the invention is not limited to such arrangement only. The preset graphic includes various different line graphics such as a line drawn from left to right into a circle or a triangle, or a line drawn from right to left into a rectangle or a circle. If the graphic of the motion track corresponds to one of the preset graphics, the processing module 13 will produce a corresponding action to perform the preset processing action of the digital information.

The preset processing action includes an action of performing a frame reduction, a frame enlargement, a frame rotation and a frame switching of the digital information. If the user wants to perform the frame reduction of the digital information, the user can touch the single touch display module 11 (which refers to a display module that can be controlled by a touch of a single finger) by a finger. And the detection module 12 will detect that display module 11 is touched by a predetermined method of a single touch and also will detect a duration time of touching the display module 11. The processing module 13 will determine whether the duration time is greater than the threshold value; if yes, then the frame of the digital information will be reduced. Until the user's finger is released from the display module 11, and the detection module 12 no longer detects the display module 11 being touched, and the processing module 13 will stop the frame reduction action of the digital information.

If the user wants to perform a frame enlargement of the digital information, the user can control a double touch display module 11 (which refers to a display module that can be controlled by a touch of two fingers) by two fingers, and the detection module 12 will detect that the display module 11 is touched by the predetermined method of a double touch and also will detect the duration time of touching the display module 11 by the double touch. The processing module 13 will determine whether the duration time is greater than a threshold value; if yes, then the frame of the digital information will be enlarged. Until the user's fingers are released from the display module 11, the detection module 12 will not detect the display module 11 being touched anymore, and the processing module 13 will stop the frame enlargement action of the digital information.

If the user wants to perform a frame rotation of the digital information, the user can touch the single touch display module 11 and perform a sliding action. Meanwhile, the detection module 12 will detect that the display module 11 is touched by the predetermined method of a single touch and slid, and the detection module 12 will detect a motion track (which is the slide track of the user's finger) of the touched display module 11. The processing module 13 will compare the motion track with a preset graphic. If the motion track and the preset graphic are similar and corresponsive, then the processing module 13 will rotate the frame of the digital information, such as rotating the digital information clockwise by 90 degrees.

A click area is disposed separately on both left and right sides of the display module 11. If the user wants to perform a frame switching of the digital information, the user can click one of the click areas by a finger. If the detection module 12 detects that one of the click areas is clicked by the user through a single touch method, the detection module 12 will further detect a during time of touching the display module 11. The processing module 13 will determine whether the duration time is greater than a threshold value; if yes, the processing module 13 will switch the digital information to other digital information. This method can achieve the effects of changing information or changing webpages.

In the description above, the display module 11 can be set with a detecting area, and the detection module 12 can determine whether the detecting area is touched. Thereby, the user must touch the detecting area only, and then the processing module 13 will execute the preset processing action of the digital information, so as to prevent a wrong action triggered by accident. The detection module 12 will detect an area of the display module 11 touched by the user's finger. If the area of the display module 11 touched by the user's finger is greater than or smaller than a predetermined value, the processing module 13 will not perform any preset processing action of the digital information to improve the precision of the detection.

Figure 2:
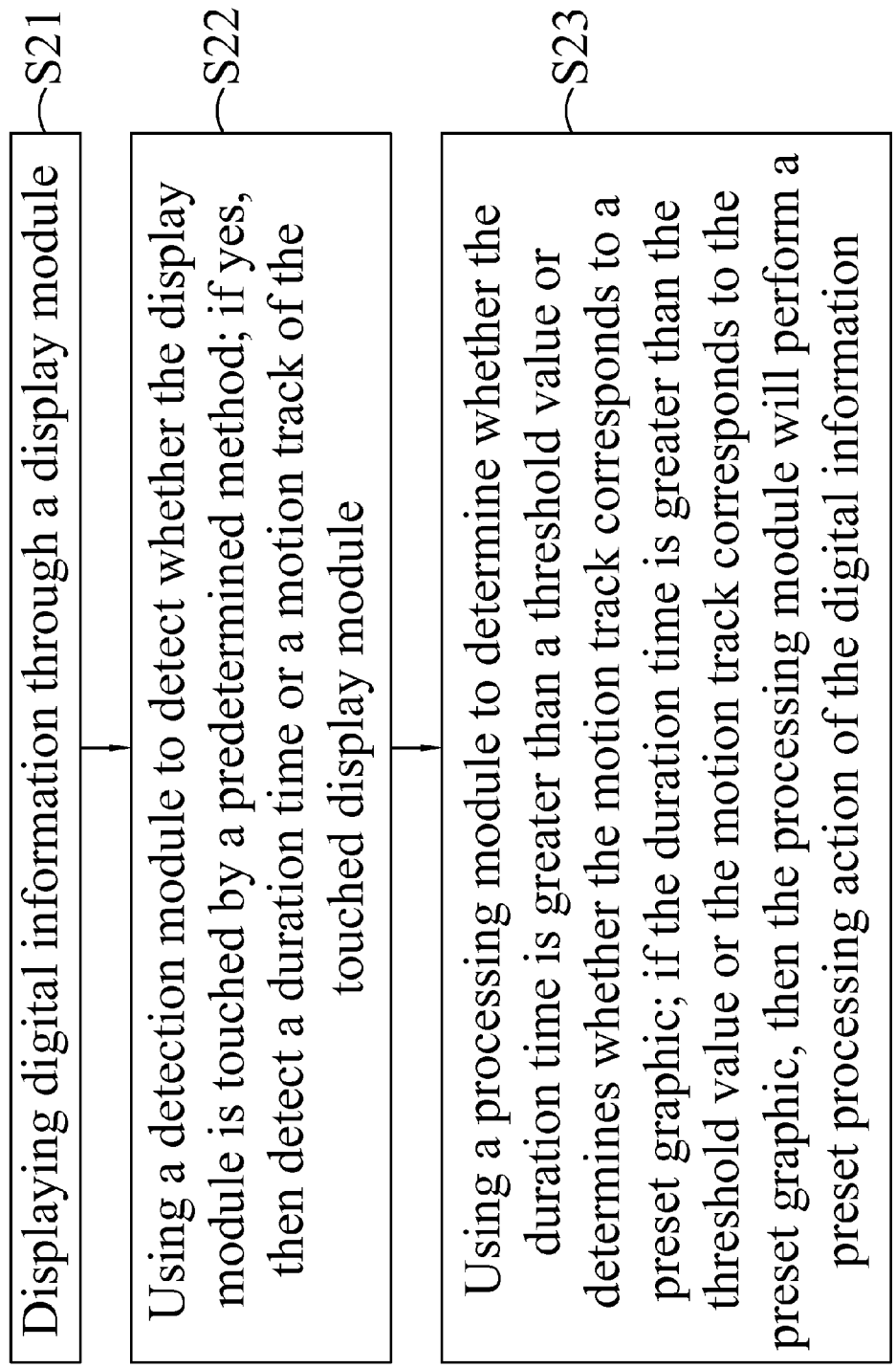
FIG. 2 is a flow chart of a frame control method of digital information in accordance with the present invention.

With reference to FIG. 2 for a flow chart of a frame control method of digital information in accordance with the present invention, the method is applied in the handheld electronic device 1 as shown in FIG. 1, and the frame control method comprises the following steps:

S21: Displaying digital information through a display module 11.

S22: Using a detection module 12 to detect whether the display module 11 is touched by a predetermined method; if yes, then detect a duration time or a motion track of the touched display module 11.

S23: Using a processing module 13 to determine whether the duration time is greater than a threshold value or determines whether the motion track corresponds to a preset graphic; if the duration time is greater than the threshold value or the motion track corresponds to the preset graphic, then the processing module 13 will perform a preset processing action of the digital information.

Figure 3A:
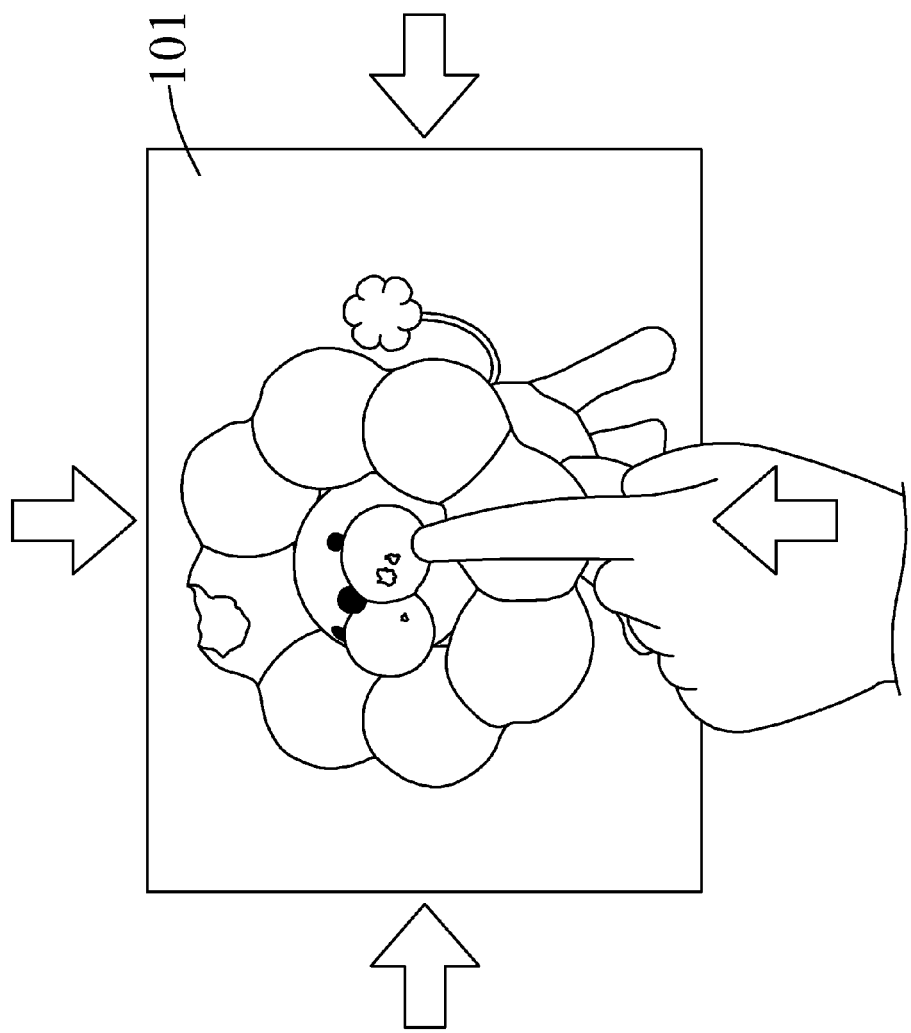
FIG. 3A is a first schematic view of a handheld electronic device and a frame control method of digital information in accordance with a first preferred embodiment of the present invention.
Figure 3B:
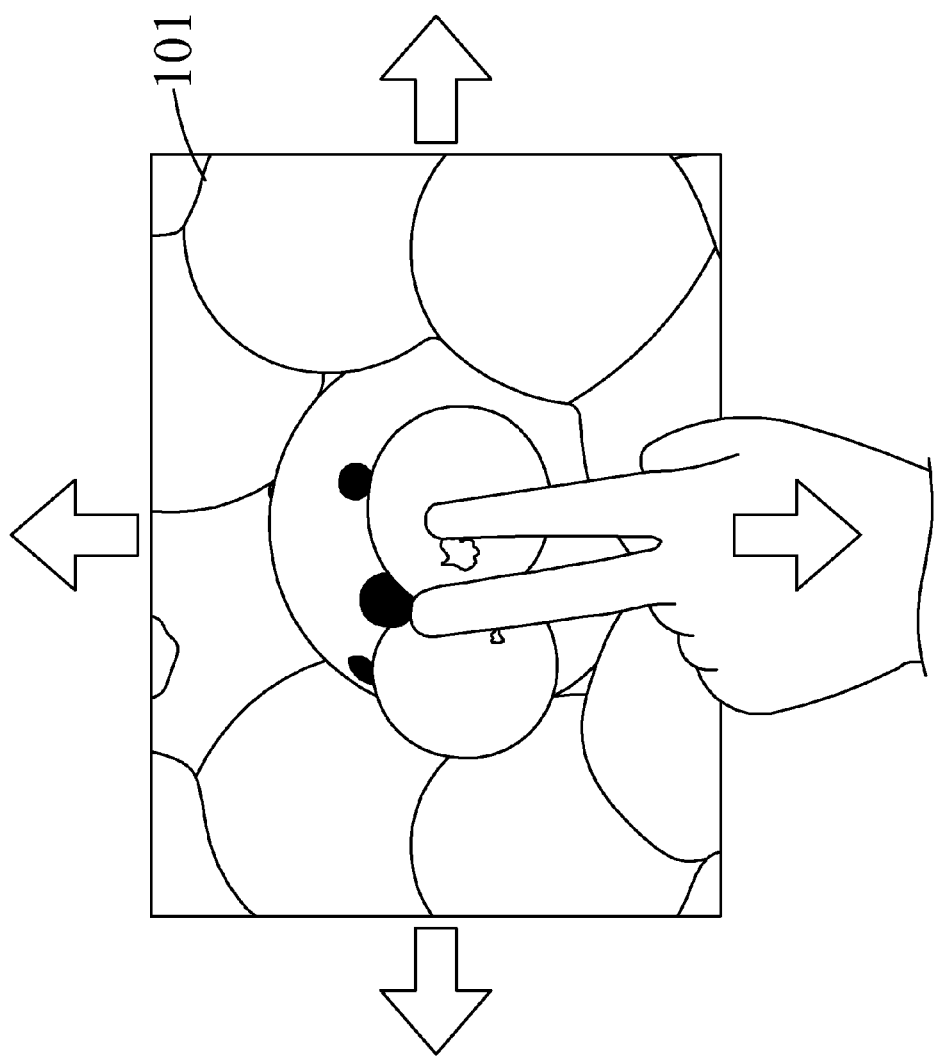
FIG. 3B is a second schematic view of a handheld electronic device and a frame control method of digital information in accordance with the first preferred embodiment of the present invention.
Figure 3C:
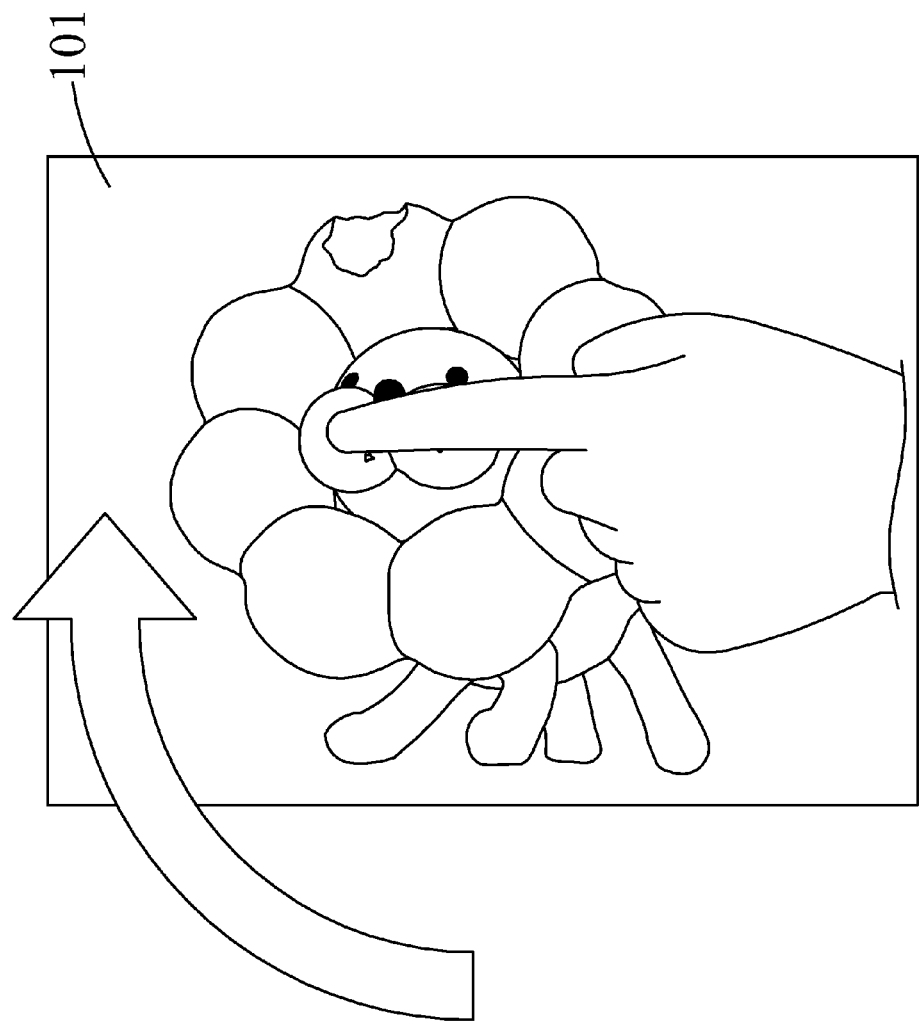
FIG. 3C is a third schematic view of a handheld electronic device and a frame control method of digital information in accordance with the first preferred embodiment of the present invention.
Figure 3D:
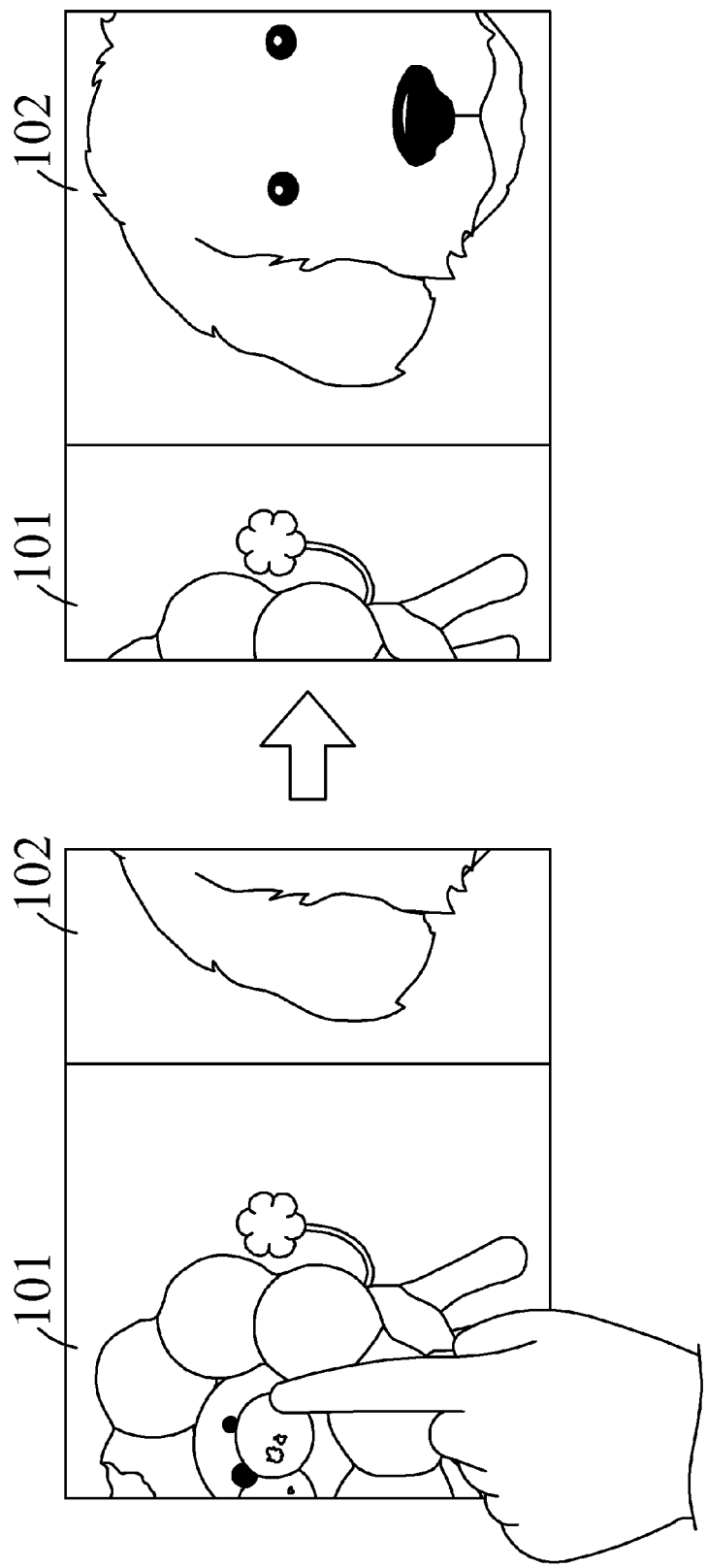
FIG. 3D is a fourth schematic view of a handheld electronic device and a frame control method of digital information in accordance with the first preferred embodiment of the present invention.
Figure 3E:
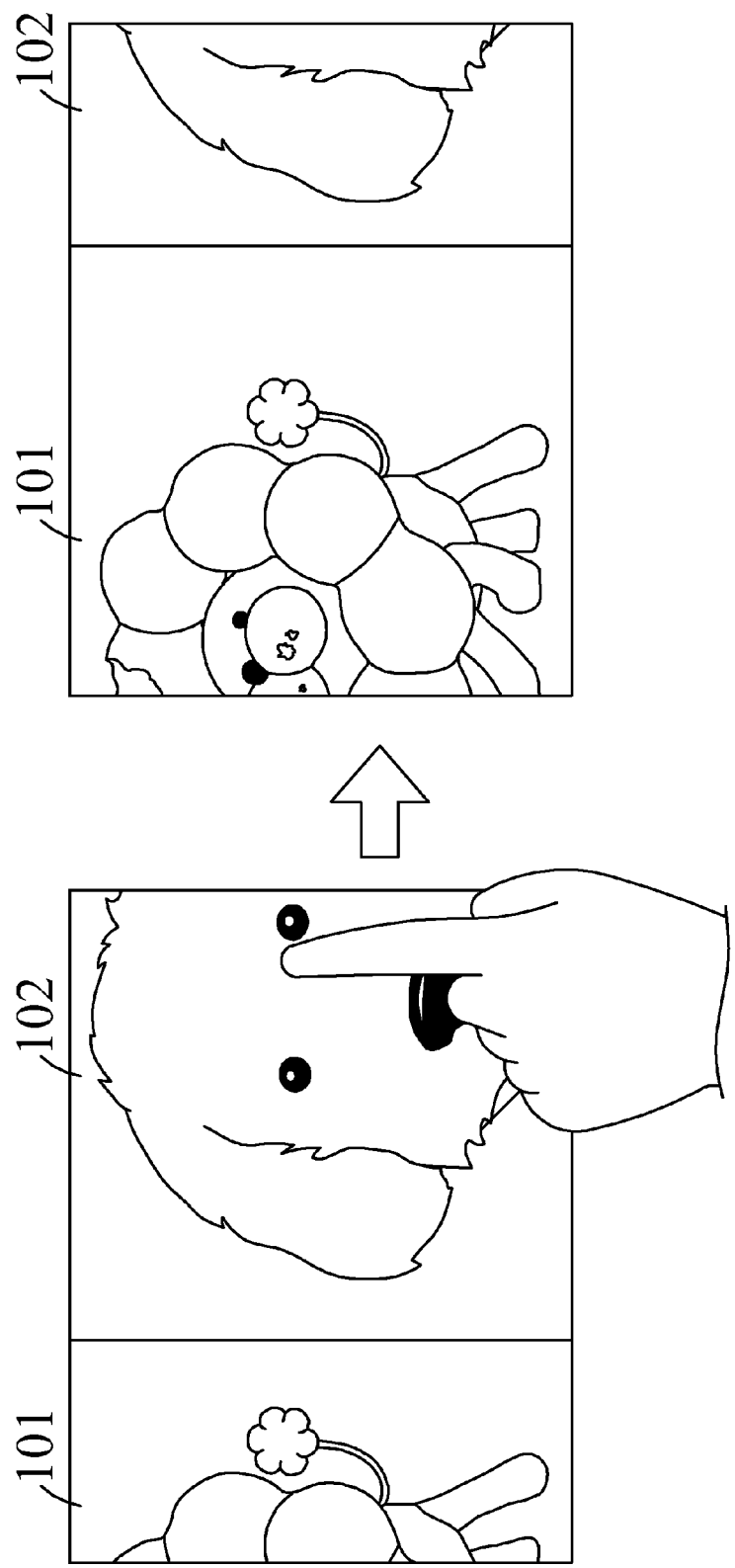
FIG. 3E is a fifth schematic view of a handheld electronic device and a frame control method of digital information in accordance with the first preferred embodiment of the present invention.

With reference to FIGS. 3A to 3E for schematic views of a handheld electronic device and a frame control method of digital information in accordance with the first preferred embodiment of the present invention respectively, the handheld electronic device can provide a simple way for a user to control the frames of digital information by simple hand postures. In FIG. 3A, the user can use a finger to touch a touch screen of the handheld electronic device by a single touch method. If the user touches the touch screen for 0.5 to 1 second, then the frame of the first digital information 101 displayed on the touch screen will be reduced. If the user wants to perform a frame enlargement of the first digital information 101, the user can use two fingers to touch the touch screen of the handheld electronic device by a double touch method for 0.5 to 1 second, then the result will be as shown in FIG. 3B. If the user wants to rotate the frame of the first digital information 101, the user can use a finger to touch the touch screen of the handheld electronic device by a single touch method and then slide on the touch screen as shown in FIG. 3C. For example, if the user wants to rotate the first digital information 101 clockwise by 90 degrees, the user can use a finger to touch the touch screen and then slide clockwise to draw a circle on the touch screen so as to achieve the expected frame rotation effect. In FIG. 3D, the user can use a finger to click the click area disposed on the left side of the touch screen and keep touching the click area for 0.5 to 1 second, so that the first digital information 101 will be moved towards the left side and switched to second digital information 102. If the user wants to switch first digital information 101 back, then the user can use a finger to touch the click area disposed on the right side of the touch screen and keep touching the click area for 0.5 to 1 second, so that the second digital information 102 will be moved towards the right side and switched back to the first digital information 101 as shown in FIG. 3E.

Figure 4:
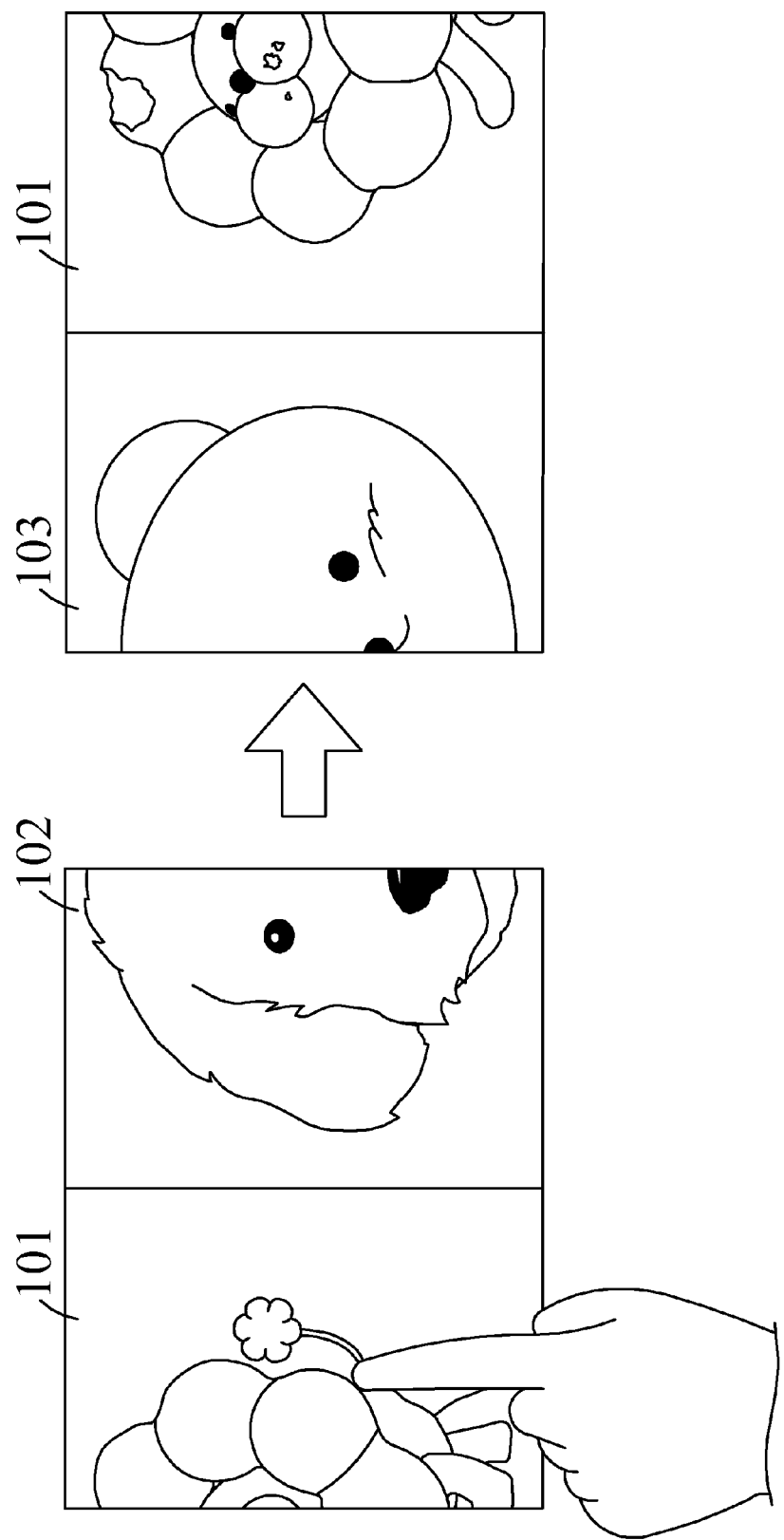
FIG. 4 is a schematic view of a handheld electronic device and a frame control method of digital information in accordance with a second preferred embodiment of the present invention.

With reference to FIG. 4 for a schematic view of a handheld electronic device and a frame control method of digital information in accordance with the second preferred embodiment of the present invention, this preferred embodiment shows that the frame of the digital information is switched to other digital information. In the touch screen of the handheld electronic device of the present invention, the first digital information 101 and the second digital information 102 can be displayed simultaneously. If the user wants to switch the information displayed on the touch screen, the user can use a finger to touch a click area on the left or right side of the touch screen. If the user clicks on the left side and keeps touching the click area for a time exceeding a threshold value, then the first digital information 101 and the second digital information 102 will be moved to the right side, so that the first digital information 101 and the third digital information 103 are displayed on the touch screen as shown in FIG. 4.

In summation of the description above, the handheld electronic device and the frame control method of digital information of the present invention can provide a simple and convenient way for users to control the frame of digital information appeared on the screen by a touch control method of using one or two fingers.

What is claimed is:

1. A handheld electronic device, comprising:
    a display module, displaying a digital information;
    a detection module, coupled to the display module, for detecting whether the display module is touched by a predetermined manner, and detecting a duration time of the touched display module if the display module is touched by the predetermined manner; and
    a processing module, coupled to the display module and the detection module, for determining whether the duration time is greater than a threshold value; and performing a preset processing action of the digital information if the duration time is greater than the threshold value;
    wherein if the detection module detects that the display module is touched by the predetermined manner of a single touch, the detection module detects the duration time of touching the display module, and the processing module determines whether the duration time is greater than the threshold value and perform the preset processing action of a frame reduction of the digital information.

2. The handheld electronic device of claim 1, wherein if the detection module detects that the display module is no longer touched, the processing module stops performing the preset processing action of the frame reduction of the digital information.

3. The handheld electronic device of claim 1, wherein if the detection module detects the display module is touched by the predetermined manner of a double touch, the detection module detects the duration time of touching the display module, and the processing module determines whether the duration time is greater than the threshold value, and performs the preset processing action of a frame enlargement of the digital information if the duration time is greater than the threshold value.

4. The handheld electronic device of claim 3, wherein if the detection module detects that the display module is no longer touched, the processing module stops performing the preset processing action of the frame enlargement of the digital information.

5. The handheld electronic device of claim 1, wherein the display module sets a detecting area, and the detection module performs a touch detection of the detecting area.

6. A frame control method of digital information, applied in a handheld electronic device, comprising the steps of:
  displaying digital information through a display module of the handheld electronic device;
  detecting whether the display module is touched by a predetermined method through a detection module of the handheld electronic device, and detecting a duration time of the touched display module if the display module is touched by the predetermined method; and
  using a processing module of the handheld electronic device to determine whether the duration time is greater than a threshold value, and performing a preset processing action of the digital information if the duration time is greater than a threshold value;
  wherein if the detection module detects that the display module is touched by the predetermined method of a single touch, the detection module further detects the duration time of touching the display module, and the processing module determines whether the duration time is greater than the threshold value, and performs the preset processing action of a frame reduction of the digital information if the duration time is greater than the threshold value.

7. The frame control method of digital information as recited in claim 6, further comprising the step of using the detection module to detect whether the display module is still touched, and using the processing module to stop performing the preset processing action of the frame reduction of the digital information if the display module is not touched.

8. The frame control method of digital information as recited in claim 6, wherein if the detection module detects that the display module is touched by the predetermined method of a double touch, the detection module further detects the duration time of touching the display module, and the processing module determines whether the duration time is greater than the threshold value and performs the preset processing action of a frame enlargement of the digital information if the duration time is greater than the threshold value.

9. The frame control method of digital information as recited in claim 8, further comprising the steps of using the detection module to detect whether the display module is still touched, and using the processing module to stop performing the preset processing action of the frame enlargement of the digital information, if the display module is not touched.

* * * * *